B. S. CHILSON.
MOTOR CYCLE SEAT.
APPLICATION FILED MAR. 20, 1914.
1,144,588.
Patented June 29, 1915.
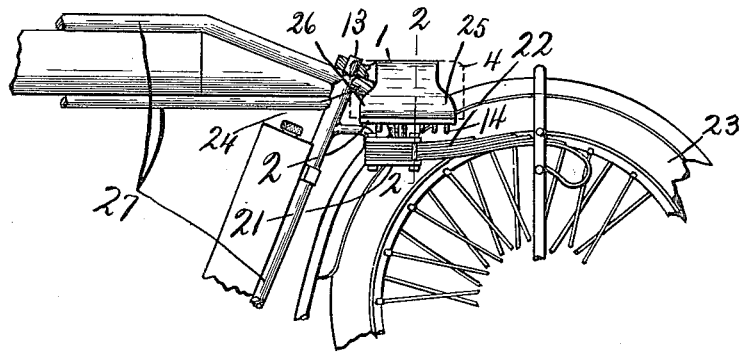
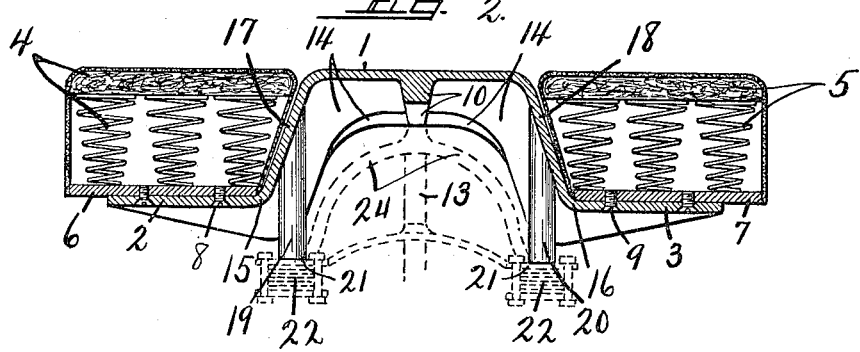
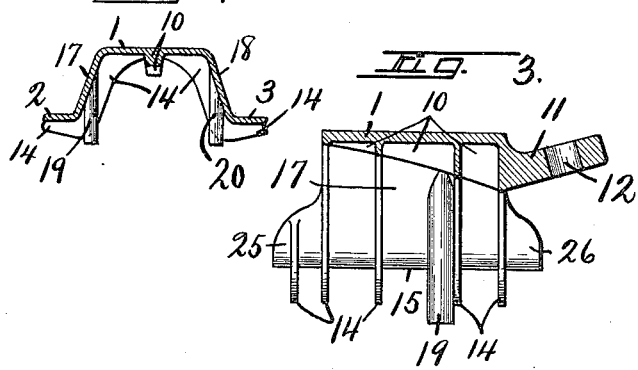
WITNESSES:
INVENTOR.
Bert S. Chilson
BY
Howard P. Denison
ATTORNEY.

UNITED STATES PATENT OFFICE.

BERT S. CHILSON, OF FAYETTEVILLE, NEW YORK.

MOTOR-CYCLE SEAT.

1,144,588. Specification of Letters Patent. Patented June 29, 1915.

Application filed March 20, 1914. Serial No. 825,974.

*To all whom it may concern:*

Be it known that I, BERT S. CHILSON, of Fayetteville, in the county of Onondaga, in the State of New York, have invented new and useful Improvements in Motor-Cycle Seats, of which the following, taken in connection with the accompanying drawings, is a full, clear, and exact description.

This invention relates to certain improvements in seats, and more particularly to a seat for a motor cycle or other like vehicle.

In the use of motor cycles and similar vehicles, it is very desirable and convenient to be able to carry two people, and heretofore supplementary seats have been used for this purpose and positioned at different places upon the frame of the motor cycle, some times in front of, but more often to the rear of, the regular seat. This tandem arrangements of the seats is very unsatisfactory, particularly for the reason that the passenger using the supplementary seat is compelled to face at right angles to the direction of movement of the vehicle and the practical effect of this is that if the motor cycle tips over in a direction away from the one in which the passenger is facing, the passenger is thrown over backward and is unable in any manner to save himself or to break the abruptness of the fall. Further, the back of the person sitting upon the regular seat is directly toward the passenger, which is also a very unsatisfactory arrangement.

The primary object of my invention is to produce a motor cycle seat adapted to carry two people, both facing in the direction of movement of the vehicle and positioned side by side upon opposite sides of the frame.

A further object is to provide a seat which is so constructed that it may be provided with spring upholstery without raising the position of the seat occupants above the normal and desirable plane.

A further object is to construct the seat so as to have a three-point bearing upon the motor cycle frame, preferably as shown, a forward bearing centrally of the frame and two opposite rearward bearings disposed at opposite sides of the frame.

Other objects relate to the particular form of the seat and in providing the body portion or frame of the seat with a substantially centrally arranged longitudinal rib and a plurality of cross ribs terminating at or merging into the longitudinal rib, and likewise merging into the edge of the seat frame and enlarged at the curved or angular portions of the frame to provide a maximum strengthening and reinforcing means.

In the drawings—Figure 1 is a side view of a portion of a motor cycle equipped with this invention. Fig. 2 is a cross section on line 2—2, Fig. 1. Fig. 3 is a central, longitudinal cross section of the seat frame showing the longitudinal reinforcing rib in full. Fig. 4 is a view similar to Fig. 2, showing a slightly different form of reinforcing cross ribs.

The invention comprises a seat frame or body portion formed with a central flat upper portion —1— and substantially flat end portions —2— and —3—, depressed some distance below the plane of the face —1— and adapted to receive suitable spring seats or other cushioning members —4— and —5—, respectively, of sufficient thickness so that their top surface preferably lies in substantially the same plane as the plane of the face —1—. Preferably, the ends —2— and —3— have attached thereto suitable platelike members —6— and —7— by means of bolts or screws —8— and —9—, respectively, and to these members —6— and —7— the cushioning members or spring seats are attached.

The body portion or frame of the seat is preferably an integral casting and is formed with a suitable central longitudinal reinforcing rib —10— of sufficient width at its front to suitably reinforce the projecting member —11— provided with an opening —12— for engagement with the usual post —13— of the motor cycle frame, and this rib —10— gradually narrows toward its rear portion until it merges into the rear edge of the frame. The body portion is also formed with suitable cross ribs —14— merging into the edge of the depressed portions —2— and —3— and gradually widening toward the curved or angular corners —15— and —16—, and extending upwardly of the sides —17— and —18— of the frame and across the under side of the top —1—, merging as shown in Fig. 2 into the longitudinal rib —10—, or as shown in Fig. 4, merging into the top —1— directly at the base of the rib —10—. The body portion of the seat is also formed with suitable supporting members —19— and —20— preferably disposed at opposite sides of the central rib —10— and, therefore, at opposite sides of the engaging opening —12— of the projection —11— and adapted to form, in connection with the opening —12— engaging the post —13—, a three-point bearing for the seat, and for this purpose these supports are of suitable length and suitably disposed so as to engage the plate —12— supported by the springs —22— upon opposite sides of the vehicle wheel —23— and so positioned as to abut against the bifurcated brace member —24— attached to the plate —21—, in such a manner as to prevent lateral movement of the seat. It will be apparent in this connection that although I have described and shown a particular arrangement of these supports in connection with a particular construction of frame support for the motor cycle, that the essence of this portion of the invention lies in a three-point support for the seat and that the relative position, arrangement and size of these supports and the parts of the frame with which they contact may be varied at will, without departing from the spirit of this invention, so long as means is provided for supporting the seat at three points.

In the particular form of motor cycle shown, the frame —27— is supported at the rear entirely by the springs —22— and the spring seats —4— and —5— are not so essential as in connection with rigidly supported frames, and it is readily apparent that particularly in connection with spring supported frames, the spring seats or cushioning members may be omitted, without affecting the usefulness or operativeness of the structure.

The side walls —17— and 18— are, as shown, preferably widened intermediate the section —1— and the depressed ends —2— and —3— respectively, to form forwardly and rearwardly projecting flanges —25— and —26— merging into the relatively large flat, depressed ends —2— and —3— and the reinforcing rib upon each of the rearward flanges —25— merges at its ends into the seat frame and the forward or front reinforcing rib extends upwardly to reinforce the projection —11— and the flange —26—.

It will now be apparent that many changes may be made in the details of construction and arrangement and in the particular form of the device, without departing from the spirit of this invention as set forth in the appended claims.

What I claim is:

1. A motor cycle seat having a central section and opposite end sections depressed below the plane of the central section, side walls connecting the central section to each of the depressed end sections, a lug projecting from the front side of the central section and provided with an opening adapted to engage a seat-post on the vehicle frame, a supporting post depending from each of the side walls and loosely resting upon portions of the vehicle frame at the rear of the seat post and upon opposite sides of the body of the frame.

2. A motor cycle seat comprising a seat member having seat portions adapted to be disposed upon opposite sides of the motor cycle frame, a lug positioned substantially centrally of and projecting forwardly from the front edge of said seat member, and separate posts projecting downwardly from the under side of said member and adapted to engage the vehicle frame.

3. A motor cycle seat comprising a member having seat portions adapted to be disposed on opposite sides of the vehicle frame, a lug projecting from the front edge of said member and adapted to engage a portion of the vehicle frame, and separate posts projecting downwardly from said member at the rear of said lug and resting upon portions of the vehicle frame at opposite sides of the body thereof.

4. A motor cycle seat comprising a seat member having seat portions adapted to be disposed upon opposite sides of the motor cycle frame, a lug positioned substantially centrally of and projecting forwardly from the front edge of said seat member and adapted to be engaged with a post upon the vehicle frame, a rib extending rearwardly from said lug and upon the underside of said member, and separate posts projecting downwardly from said member upon opposite sides of said rib and adapted to engage the vehicle frame.

5. A motor cycle seat comprising a seat member having seat portions adapted to be disposed upon opposite sides of the motor cycle frame, a lug positioned substantially centrally of and projecting forwardly from the front edge of said seat member, a longitudinal rib extending rearwardly from said lug and upon the underside of said member, a cross rib upon each side of said longitudinal rib and separate posts projecting downwardly from said member upon opposite sides of said longitudinal rib and adapted to engage the vehicle frame.

6. A motor cycle seat comprising a seat member having seat portions adapted to be disposed upon opposite sides of the motor cycle frame, a lug in connection with said member adapted to be removably engaged with a post upon the vehicle frame, and separate posts projecting downwardly from the underside of said member and adapted to engage the vehicle frame.

7. A motor cycle seat comprising a seat member having seat portions adapted to be disposed upon opposite sides of the motor cycle frame, a lug in connection with said member adapted to be removably engaged with a post upon the vehicle frame, said seat member having two spaced portions resting upon spaced portions of the vehicle frame to the rear of the lug and upon opposite sides thereof, and thereby constituting a three-point support for said member.

In witness whereof I have hereunto set my hand this 17th day of March, 1914.

BERT S. CHILSON.

Witnesses:
E. A. THOMPSON,
VIOLA HOWLAND.

Copies of this patent may be obtained for five cents each, by addressing the "Commissioner of Patents, Washington, D. C."